United States Patent
Freikorn et al.

(10) Patent No.: US 10,496,484 B2
(45) Date of Patent: Dec. 3, 2019

(54) METHODS AND APPARATUS FOR ERROR DETECTION FOR DATA STORAGE DEVICES

(71) Applicant: SANDISK TECHNOLOGIES LLC, Plano, TX (US)

(72) Inventors: Guy Freikorn, Oranit (IL); Judah Gamliel Hahn, Ofra (IL)

(73) Assignee: SanDisk Technologies LLC, Addison, TX (US)

( * ) Notice: Subject to any disclaimer, the term of this patent is extended or adjusted under 35 U.S.C. 154(b) by 313 days.

(21) Appl. No.: 15/229,886

(22) Filed: Aug. 5, 2016

(65) Prior Publication Data

US 2018/0039538 A1 Feb. 8, 2018

(51) Int. Cl.
| G06F 11/10 | (2006.01) |
| G06F 11/00 | (2006.01) |
| G11C 29/52 | (2006.01) |
| G06F 3/06  | (2006.01) |
| G06F 11/14 | (2006.01) |

(52) U.S. Cl.
CPC .................................... *G06F 11/14* (2013.01)

(58) Field of Classification Search
None
See application file for complete search history.

(56) References Cited

U.S. PATENT DOCUMENTS

| 5,177,744 A * | 1/1993 | Cesare ............... G06F 11/1008 714/6.24 |
| 6,467,047 B1 * | 10/2002 | Scaringella ......... G06F 11/1032 711/114 |
| 6,898,738 B2 * | 5/2005 | Ryan ................... G06F 11/1666 711/E12.017 |
| 8,589,759 B2 * | 11/2013 | Cox ....................... G06F 11/167 714/763 |
| 9,378,098 B2 * | 6/2016 | Tian ..................... G06F 11/1451 |
| 9,384,128 B2 | 7/2016 | Tuers et al. |
| 2003/0065983 A1 | 4/2003 | Miller et al. |
| 2009/0172260 A1 | 7/2009 | Olbrich et al. |
| 2014/0250348 A1 | 9/2014 | Harari et al. |
| 2015/0121132 A1 * | 4/2015 | Tian .................... G06F 11/1451 714/6.24 |
| 2017/0168898 A1 * | 6/2017 | Zbiciak ............... G06F 11/1405 |

* cited by examiner

*Primary Examiner* — Justin R Knapp
(74) *Attorney, Agent, or Firm* — Vierra Magen Marcus LLP (57) ABSTRACT

A device includes a memory device and a controller. The controller is configured to receive data to be stored in the non-volatile memory and to store a first copy of the data and a second copy of the data to a volatile memory. The controller is configured, in response to detecting a bit error corresponding to the first copy of the data prior to storage of the first copy of the data to the non-volatile memory, to perform an error detection operation that includes comparing first redundancy data corresponding to the first copy of the data to second redundancy data corresponding to the second copy of the data.

20 Claims, 6 Drawing Sheets

METHODS AND APPARATUS FOR ERROR DETECTION FOR DATA STORAGE DEVICES

FIELD OF THE DISCLOSURE

This disclosure is generally related to data storage devices and more particularly to data integrity in data storage devices.

BACKGROUND

Non-volatile data storage devices, such as flash solid state drive (SSD) memory devices or removable storage cards, have allowed for increased portability of data and software applications. Flash memory devices can enhance data storage density by storing multiple bits in each flash memory cell. For example, Multi-Level Cell (MLC) flash memory devices provide increased storage density by storing 2 bits per cell, 3 bits per cell, 4 bits per cell, or more. Although increasing the number of bits per cell and reducing device feature dimensions may increase a storage density of a non-volatile memory, a bit error rate of data stored at the non-volatile memory may also increase.

Error correction coding (ECC) is often used to correct errors that occur in data read from a non-volatile memory. Prior to storage, data may be encoded by an ECC encoder to generate redundant information. "parity bits") that is associated with parity checks of the ECC encoding scheme and that may be stored with the data as an ECC codeword. As more parity bits are used, an error correction capacity of the ECC increases and a number of bits to store the encoded data also increases.

Although ECC encoding may be used to correct errors in data read from a non-volatile memory, ECC decoding cannot repair bit errors that were present in the data prior to the ECC encoding. Data may be corrupted prior to being received at an ECC encoder, such as due to cosmic radiation, radiative contaminations in packaging material or chips, failures such as temporary power drops, etc. For example, data may be corrupted as the data is transmitted along a data path of the storage device to the ECC encoder.

DETAILED DESCRIPTION

Particular examples in accordance with the disclosure are described below with reference to the drawings. In the description, common features are designated by common reference numbers. As used herein, "exemplary" may indicate an example, an implementation, and/or an aspect, and should not be construed as limiting or as indicating a preference or a preferred implementation. Further, it is to be appreciated that certain ordinal terms (e.g., "first" or "second") may be provided for identification and ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") may indicate "one or more" rather than "one," As used herein, a structure or operation that "comprises" or "includes" an element may include one or more other elements not explicitly recited. Further, an operation performed "based on" a condition or event may also be performed based on one or more other conditions or events not explicitly recited.

Figure 1:
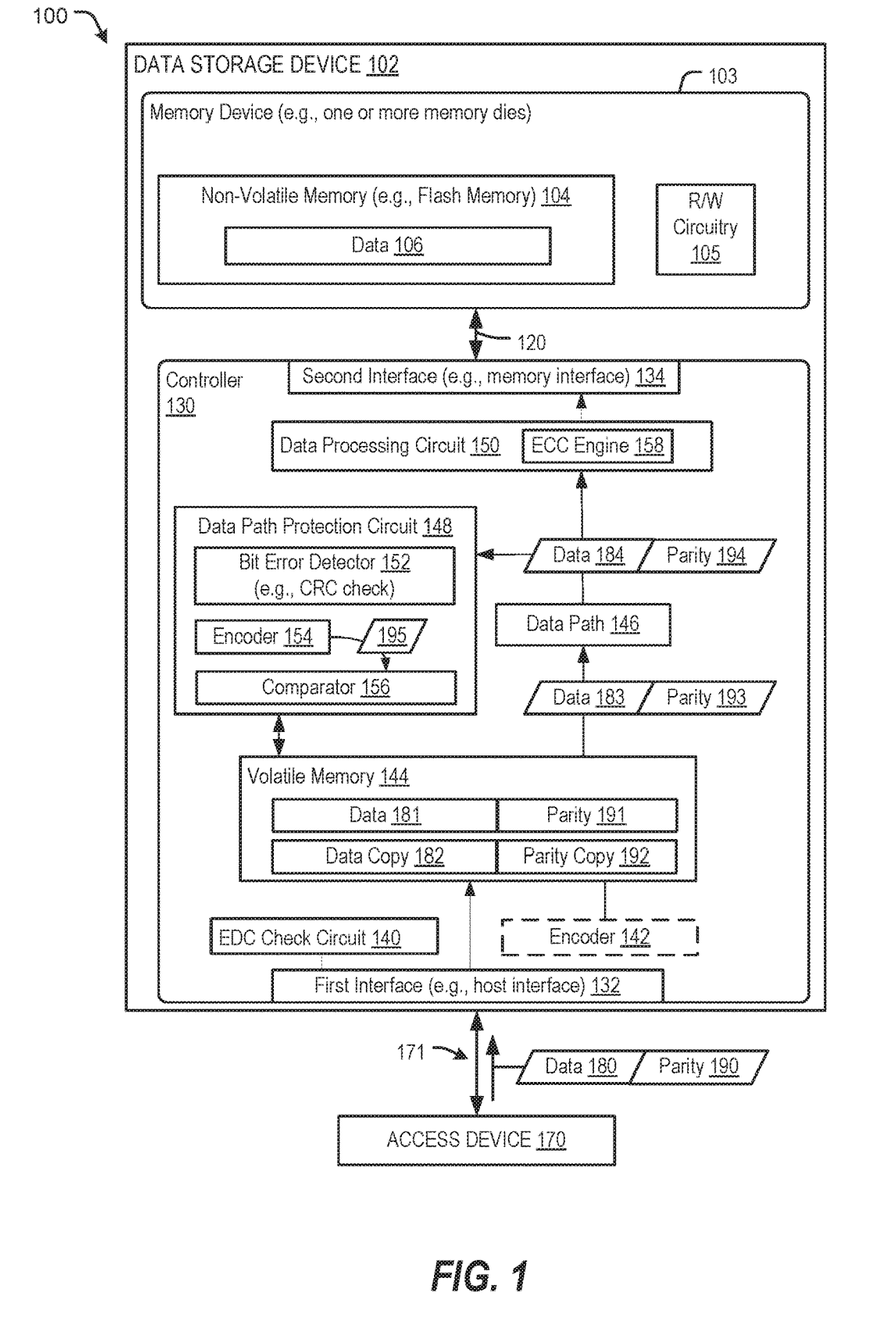
FIG. 1 is a block diagram of an illustrative example of a system including a data storage device configured to detect and correct errors that may occur along a data path of the data storage device.

FIG. 1 depicts an illustrative example of a system 100 that includes a data storage device 102 and an access device 170 (e.g., a host device or another device). The data storage device 102 is configured to maintain, at a volatile memory 144, a copy of data to be stored at a non-volatile memory. The copy of the data may be used for data recovery in case the data becomes corrupted along a data path of the data storage device 102.

To illustrate, data may be received from the access device 170 and transferred to a data processing circuit 150 that includes an ECC engine 158. The data may be encoded to generate redundancy information (e.g., parity data) and may be transferred along a data path 146 between the volatile memory 144 and the data processing circuit 150 while a backup copy of the data is maintained at the volatile memory 144. Upon the data reaching the data processing circuit 150, a data path protection circuit 148 may use the redundancy information to determine whether the data has been corrupted.

If the data is identified as being corrupted, the corrupted data may be discarded and the backup copy of the data may be accessed at the volatile memory 144 for re-transmission of the data to the data processing circuit 150. Because the re-transmitted data may also become corrupted during transmission along the data path 146, multiple attempts to re-transmit the data may be performed until an uncorrupted version of the data is received at the data processing circuit 150. The backup copy of the data may therefore be maintained in the volatile memory 144 until an uncorrupted version of the data has been received at the data processing circuit 150.

In addition to the possibility of data corruption along the data path 146, data corruption may occur to the backup data in the volatile memory 144. For example, a cosmic ray striking a memory cell in the volatile memory 144 may alter the data that is stored in the memory cell, such as by changing a 1-bit to a 0-bit or changing a 0-bit to a 1-bit. Therefore, an integrity of the backup data may be verified by performing an error detection operation using the redundancy data prior to re-transmitting the data via the data path 146 to the data processing circuit 150. Verifying the integrity of the backup data enables the data storage device 102 to reduce or prevent the loss of power, time, and processing resources that would be consumed by sending corrupt data along the data path 146. In addition, in some implementations data integrity may be verified even when the redundancy information becomes corrupted, as described in further detail with reference to FIG. 2.

The data storage device 102 and the access device 170 may be coupled via a connection (e.g., a communication path 171), such as a bus or a wireless connection. The data storage device 102 may include a first interface 132 (e.g., an access device interface or host interface) that enables communication via the communication path 171 between the data storage device 102 and the access device 170.

The data storage device 102 may include or correspond to a solid state drive (SSD) which may be included in, or distinct from (and accessible to), the access device 170. For example, the data storage device 102 may include or correspond to an SSD, which may be used as an embedded storage drive (e.g., a mobile embedded storage drive), an enterprise storage drive (ESD), a client storage device, or a cloud storage drive, as illustrative, non-limiting examples. In some implementations, the data storage device 102 is coupled to the access device 170 indirectly, e.g., via a network. For example, the network may include a data center storage system network, an enterprise storage system network, a storage area network, a cloud storage network, a local area network (LAN), a wide area network (WAN), the Internet, and/or another network. In some implementations, the data storage device 102 may be a network-attached storage (NAS) device or a component (e.g., a solid-state drive (SSD) device) of a data center storage system, an enterprise storage system, or a storage area network.

In some implementations, the data storage device 102 may be embedded within the access device 170, such as in accordance with a Joint Electron Devices Engineering Council C) Solid State Technology Association Universal Flash Storage (UFS) configuration. For example, the data storage device 102 may be configured to be coupled to the access device 170 as embedded memory, such as eMMC® (trademark of JEDEC Solid State Technology Association, Arlington, Va.) and eSD, as illustrative examples. To illustrate, the data storage device 102 may correspond to an eMMC (embedded MultiMedia Card) device. As another example, the data storage device 102 may correspond to a memory card, such as a Secure Digital (SD®) card, a microSD® card, a miniSD™ card (trademarks of SD-SC LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). Alternatively, the data storage device 102 may be removable from the access device 170 (i.e., "removably" coupled to the access device 170). As an example, the data storage device 102 may be removably coupled to the access device 170 in accordance with serial bus (USB) configuration.

The data storage device 102 may operate in compliance with an industry specification. For example, the data storage device 102 may include a SSD and may be configured to communicate with the access device 170 using a small computer system interface (SCSI)-type protocol, such as a serial attached SCSI (SAS) protocol. As other examples, the data storage device 102 may be configured to communicate with the access device 170 using a NVM Express (NVMe) protocol or a serial advanced technology attachment (SATA) protocol. In other examples, the data storage device 102 may operate in compliance with a JEDEC eMMC specification, a JEDEC Universal Flash Storage (UFS) specification, one or more other specifications, or a combination thereof, and may be configured to communicate using one or more protocols, such as an eMMC protocol, a universal flash storage (UFS) protocol, a universal serial bus (USB) protocol, and/or another protocol, as illustrative, non-limiting examples.

The access device 170 may include a memory interface (not shown) and may be configured to communicate with the data storage device 102 via the memory interface to read data from and write data to a memory device 103 of the data storage device 102. For example, the access device 170 may be configured to communicate with the data storage device 102 using a SAS, SATA, or NVMe protocol. As other examples, the access device 170 may operate in compliance with a Joint Electron Devices Engineering Council (JEDEC) industry specification, such as a Universal Flash Storage (UFS) Access Controller Interface specification. The access device 170 may communicate with the memory device 103 in accordance with any other suitable communication protocol.

The access device 170 may include a processor and a memory. The memory may be configured to store data and/or instructions that may be executable by the processor. The memory may be a single memory or may include multiple memories, such as one or more non-volatile memories, one or more volatile memories, or a combination thereof. The access device 170 may issue one or more commands to the data storage device 102, such as one or more requests to erase data, read data from, or write data to the memory device 103 of the data storage device 102. For example, the access device 170 may be configured to provide data, such as data 180, to be stored at the memory device 103 or to request data to be read from the memory device 103. The access device 170 may include a mobile telephone, a computer (e.g., a laptop, a tablet, or a notebook computer), a music player, a video player, a gaming device or console, an electronic book reader, a personal digital assistant (PDA), a portable navigation device, a computer, such as a laptop computer or notebook computer, a network computer, a server, any other electronic device, or any combination thereof, as illustrative, non-limiting examples.

The memory device 103 of the data storage device 102 may include one or more memory dies (e.g., one memory die, two memory dies, eight memory dies, or another number of memory dies). The memory device 103 includes a non-volatile memory 104, such as a non-volatile memory of storage elements included in a memory die of the memory device 103. For example, the non-volatile memory 104 may include a flash memory, such as a NAND flash memory, or a resistive memory, such as a resistive random access memory (ReRAM), as illustrative, non-limiting examples. In some implementations, the non-volatile memory 104 may include or correspond to a memory die of the memory device 103. The non-volatile memory 104 may have a three-dimensional (3D) memory configuration. As an example, the non-volatile memory 104 may have a 3D vertical bit line (VBL) configuration. In a particular implementation, the non-volatile memory 104 is a non-volatile memory having a 3D memory configuration that is monolithically formed in one or more physical levels of arrays of memory cells having an active area disposed above a silicon substrate. Alternatively, the non-volatile memory 104 may have another configuration, such as a two-dimensional (2D) memory configuration or a non-monolithic 3D memory configuration (e.g., a stacked die 3D memory configuration).

Although the data storage device 102 is illustrated as including the memory device 103, in other implementations the data storage device 102 may include multiple memory devices that may be configured in a similar manner as described with respect to the memory device 103. For example, the data storage device 102 may include multiple memory devices, each memory device including one or more packages of memory dies, each package of memory dies including one or more memories such as the non-volatile memory 104.

The non-volatile memory 104 may include one or more blocks, such as a NAND flash erase group of storage elements. Each storage element of the non-volatile memory 104 may be programmable to a state (e.g., a threshold voltage in a flash configuration or a resistive state in a resistive memory configuration) that indicates one or more values. Each block of the non-volatile memory 104 may include one or more word lines. Each word line may include one or more pages, such as one or more physical pages. In some implementations, each page may be configured to store a codeword. A word line may be configurable to operate as a single-level-cell (SLC) word line, as a multi-level-cell (MLC) word line, or as a tri-level-cell (TLC) word line, as illustrative, non-limiting examples.

The memory device 103 may include support circuitry, such as read/write circuitry 105, to support operation of one or more memory dies of the memory device 103. Although depicted as a single component, the read/write circuitry 105 may be divided into separate components of the memory device 103, such as read circuitry and write circuitry. The read/write circuitry 105 may be external to the one or more dies of the memory device 103. Alternatively, one or more individual memory dies of the memory device 103 may include corresponding read/write circuitry that is operable to read data from and/or write data to storage elements within the individual memory die independent of any other read and/or write operations at any of the other memory dies.

The controller 130 is coupled to the memory device 103 via a bus 120, an interface (e.g., interface circuitry, such as a second interface 134), another structure, or a combination thereof. For example, the bus 120 may include one or more channels to enable the controller 130 to communicate with a single memory die of the memory device. As another example, the bus 120 may include multiple distinct channels to enable the controller 130 to communicate with each memory die of the memory device 103 in parallel with, and independently of, communication with other memory dies of the memory device 103.

The controller 130 is configured to receive data and instructions from the access device 170 and to send data to the access device 170. For example, the controller 130 may send data to the access device 170 via the first interface 132, and the controller 130 may receive data from the access device 170 via the first interface 132. The controller 130 is configured to send data, and commands to the non-volatile memory 104 and to receive data from the non-volatile memory 104. For example, the controller 130 is configured to send data and a write command to cause the non-volatile memory 104 to store data to a specified address of the non-volatile memory 104. The write command may specify a physical address of a portion of the non-volatile memory 104 (e.g., a physical address of a word line of the non-volatile memory 104) that is to store the data. The controller 130 may also be configured to send data and commands to the non-volatile memory 104 associated with background scanning operations, garbage collection operations, and/or wear leveling operations, etc., as illustrative, non-limiting examples. The controller 130 is configured to send a read command to the non-volatile memory 104 to access data from a specified address of the non-volatile memory 104. The read command may specify the physical address of a portion of the non-volatile memory 104 (e.g., a physical address of a word line of the non-volatile memory 104).

The controller 130 includes an error detection code (EDC) check circuit 140 coupled to the first interface 132. The controller 130 also includes the volatile memory 144 coupled to the data processing circuit 150 via the data path 146. The data path protection circuit 148 is coupled to an output of the data path 146 and to an input of the data processing circuit 150. In some implementations, the controller 130 may include an encoder 142 coupled to the volatile memory 144.

The EDC check circuit 140 is configured to perform an error detection check operation to determine whether one or more bit errors are detected in data that is received via the first interface 132. For example, prior to sending the data 180 to the data storage device 102, the access device 170 may process the data 180 to generate a parity 190. The parity 190 includes redundancy data (e.g., a checksum, one or more parity bits, a repetition code, or a hash value, as illustrative, non-limiting examples) that is based on the data 180 and that is configured to enable detection of one or more errors that may occur in the data 180. To illustrate, the access device 170 may process the data 180 using a cyclic redundancy code (CRC) encoding scheme to generate CRC parity bits that are appended to or transmitted with the data 180 as the parity 190. The first interface 132 may be configured to receive the data 180 and first redundancy data (the parity 190) from the access device 170. The EDC check circuit 140 may be configured to process the received data 180 and parity 190 by using the CRC encoding scheme to generate CRC parity bits based on the received data 180 and comparing the generated CRC parity bits to the parity 190. If the generated CRC parity bits do not match the parity 190, one or more errors has occurred in the data 180 (or in the parity 190) during transmission from the access device 170 to the data storage device 102, and re-transmission of the data 180 may be requested from the access device 170.

In some implementations, the parity 190 that is received from the access device 170 may be stored to the volatile memory 144 as parity 191 and used for error detection of the data 180 due to possible corruption of the data 180 along the data path 146. In other implementations, an encoder 142 may be configured to process the data 180 to generate another parity 191 to be stored in the volatile memory 144. For example, the encoder 142 may perform a different CRC scheme that has a different error detection capacity as compared to the CRC scheme applied by the access device 170. For example, the access device 170 may apply a first CRC scheme that has a higher error detection capacity and that has a larger number of bits in the parity 190 as compared to a second CRC scheme applied by the encoder 142.

The volatile memory 144 may include dynamic random access memory (DRAM), static random access memory (SRAM), one or more registers, one or more other types of storage elements, or any combination thereof. The volatile memory 144 may be configured to receive and store data 181 and the parity 191. The data 181 may initially match the data 180 but may later differ from the data 180 due to one or more errors, such as due to a cosmic ray striking a storage element of the volatile memory 144 and causing a bit of the data 181 to change. The volatile memory 144 may be configured to store the data 181 and the parity 191 until the data 181 and the parity 191 are transferred to the data path 146 as data 183 and parity 193, respectively, and may be further configured to evict the data 181 and the parity 191 from the volatile memory 144 after transferring the data 181 and the parity 191 to the data path 146.

The volatile memory 144 is also configured to maintain a backup copy of the data 181 and the parity 191, referred to as a data copy 182 and a parity copy 192, until an uncorrupted version of the data 180 has been transferred via the data path 146 to the data processing circuit 150. For example, the volatile memory 144 may receive the data 181 and the parity 191 and may store the data 181 and the parity 191 at a location accessible to the data path 146, such as in a write path data register. The volatile memory 144 may also be configured to generate the data copy 182 and the parity copy 192 and to store the data copy 182 and the parity copy 192 at a location where the data copy 182 and the parity copy 192 may be maintained in the volatile memory 144 after the data 181 has been transferred to the data path 146. Although the memory 144 is described as storing the data copy 182 and the parity copy 192, in other implementations the memory 144 may not store the data copy 182 or may not store the parity copy 192. Examples of operation according to various implementations are described in further detail with reference to FIG. 2.

The data copy 182 may initially match the data 181 but may later differ from the data 181, such as when one or both of the data 181 or the data copy 182 are corrupted due to a bit error occurring at the volatile memory 144 (e.g., caused by a cosmic ray impact). Similarly, the parity copy 192 may initially match the parity 191 but may later differ from the parity 191, such as when one or both of the parity 191 or the parity copy 192 are corrupted due to a bit error occurring at the volatile memory 144.

The volatile memory 144 may be responsive to one or more control signals that are based on error detection processing of data that has been transferred via the data path 146 to the data processing circuit 150. For example, the volatile memory 144 may receive a control signal, such as from the data path protection circuit 148, that indicates that the data received at the data processing circuit 150 is error-free and that the data copy 182 and the parity copy 192 may be discarded (e.g., erased, marked as invalid, etc.) from the volatile memory 144. As another example, the volatile memory 144 may receive a control signal, such as from the data path protection circuit 148, that indicates that one or more errors are detected in data transferred to the data processing circuit 150. In response, the volatile memory 144 may send the data copy 182, the parity copy 192, or other data to the data path protection circuit 148 or may otherwise make the data copy 182 accessible to the data path protection circuit 148 to verify the integrity of the data copy 182, as described in further detail below. After the data copy 182 has been determined to be error-free, the volatile memory 144 may be responsive to a control signal to transfer the data copy 182 (and, in some implementations, the parity copy 192), into the data path 146.

The data path 146 may be configured to receive data from the volatile memory 144 and to transfer the data to the data processing circuit 150. For example, the data path 146 may include one or more temporary storage elements such as registers, buffers. SRAM, etc., one or more data transfer circuits such as busses, bus interfaces, printed circuit board (PCB) lines, one or more functional units or circuits such as processor cores, state machines, queues, caches, logical operators, comparators, etc., one or more other physical, mechanical, or electrical components, or any combination thereof. Data 184 and parity 194 that have been transferred to the data processing circuit 150 may match the data 183 and the parity 193, respectively, when no errors are introduced along the data path 146. Otherwise, the data 184, the parity 194, or both, may differ from the data 183 or the parity 193, respectively, due to one or more errors that are introduced along the data path 146, such as due to cosmic rays, voltage irregularities, severe temperature extremes, etc. Although the data path 146 is depicted as distinct from the volatile memory 144 and the data processing circuit 150, in other implementations the data path 146 may also include the volatile memory 144, the data processing circuit 150, or a combination thereof.

The data path protection circuit 148 may be configured to determine whether a bit error is detected in the data 184 (e.g., a first copy of the data 180 that is transferred along the data path 146) and, in response to detection of a bit error corresponding to the data 184, to perform an error detection operation to determine whether any errors are detected in the data copy 182 (e.g., a second copy of the data 182) that is stored at the volatile memory 144. For example, the error detection operation may include comparing first redundancy data corresponding to the data 184 to second redundancy data corresponding to the data copy 182 (e.g., the data copy 182) that is stored in the volatile memory 144. An illustrative example of operations that may be performed by the data path protection circuit 148 is described with reference to FIG. 2.

The data path protection circuit 148 may include a bit error detector 152 that is configured to access the data 184 and the parity 194 at the data path 146 (e.g., at an output of the data path 146), at the data processing circuit 150 (e.g., at an input of the data processing circuit 150), or a combination thereof. For example, the data path protection circuit 148 may be configured to access a data input buffer of the data processing circuit 150 and to perform a CRC check of the data 184 at the data input buffer. As another example, the data path protection circuit 148 may be configured to access or "sniff" the data 184 and the parity 194 at a data transfer line (e.g., a bus) coupled to the data input of the data processing circuit 150 and to perform a CRC check of the data at the data transfer line. In some implementations, the bit error detector 152 is configured to combine the data 184 and the parity 194 into a data word and to process the data word to generate a result (e.g., a syndrome) that indicates whether any bit errors were detected in the data word. In other implementations, the bit error detector 152 is configured to re-encode the data 184 to generate new parity for the data 184 and to compare the new parity to the parity 194. Any difference between the new parity and the parity 194 may indicate one or more bit errors in the data 184, in the parity 194, or both.

The data path protection circuit 148 may include an encoder 154 and a comparator 156. The encoder 154 may be configured to process data to generate redundancy data (e.g., parity data) corresponding to the processed data. The comparator 156 may be configured to compare first redundancy data (e.g., that is received at the data path protection circuit 148) to second redundancy data that is generated by the encoder 154. For example, the encoder 154 may be configured to process the data copy 182 to generate parity 195. The parity 195 may correspond to second redundancy data, such as a CRC check value, corresponding to the data copy 182. The comparator 156 may be configured to compare the parity 195 to the parity copy 192, to the parity 194, or both, to check the integrity of the data copy 182.

The data processing circuit 150 may include one or more functional units that are configured to process data prior to storage at the non-volatile memory 104. For example, the data processing circuit 150 may include an error correction coding (ECC) engine 158 configured to receive data to be stored to the non-volatile memory 104 and to generate a codeword. For example, the ECC engine 158 may include an encoder configured to encode data using an ECC scheme, such as a Reed Solomon encoder, a. Bose-Chaudhari-Hocquenghem (BCH) encoder, a low-density parity check (LDPC) encoder, a Turbo Code encoder, an encoder configured to encode one or more other ECC encoding schemes, or any combination thereof. The ECC engine 158 may include one or more decoders configured to decode data read from the non-volatile memory 104 to detect and correct, up to an error correction capability of the ECC scheme, any bit errors that may be present in the data.

The data processing circuit 150 may include one or more other functional units in addition to or instead of the ECC engine 158, such as a data scrambling circuit, an encryption engine, a data shaping engine, an interleaver, one or more other circuits, or a combination thereof. For example, data received at the data processing circuit 150 may be encrypted, the encrypted data may be scrambled to generate scrambled data having substantially equal amounts of "1" bits and "0" bits, and the scrambled data may be encoded by the ECC engine 158 to generate an ECC codeword. The ECC codeword may be interleaved with one or more other ECC codewords and may be output to the second interface 134 for storage at the non-volatile memory 104 as data 106.

During operation, the data storage device 102 may receive the data 180 and the parity 190 from the access device 170. The EDC check circuit 140 may perform an error detection operation (e.g., a CRC check) based on the data 180 and the parity 190 to determine whether one or more errors have occurred in the data 180 received at the first interface 132. If one or more errors are detected in the data 180, the controller 130 may send a signal to the access device 170 to request that the data 180 be re-sent to the data storage device 102. Otherwise, if no errors are detected in the received data 1820, the controller 130 may send the data 180 and the parity 190 to the volatile memory 144 for storage as the data 181 and the parity 191, respectively, and may send a signal to the access device 170 acknowledging that the data 180 has been received. In response to receiving the acknowledgment from the data, storage device 102, the access device 170 may discard a local copy of the data 180 from a staging buffer of the access device 170.

The data 181 and the parity 191 may be stored at the volatile memory 144. For example, the data 181 and the parity 191 may be written into a data write register or write path staging buffer that is coupled to the data path 146. In some implementations, the parity 191 may match the parity 190 received from the access device 170. In other implementations, the parity 191 may be generated by the encoder 142.

A copy of the data 181 and the parity 191 is also stored at the volatile memory 144 as the data copy 182 and the parity copy 192. The data copy 182 and the parity copy 192 may remain at the volatile memory 144 after the data 181 and the parity 191 have been transferred out of the volatile memory 144 and into the data path 146 as the data 183 and the parity 193, respectively.

The data path protection circuit 148 may access the data 184 and the parity 194 at the output of the data path 146. If the bit error detector 152 determines that the parity 194 corresponds to the data 184 (e.g., the bit error detector 152 performs a successful CRC check), the bit error detector 152 may generate a valid data indicator. The controller 130 or the data path protection circuit 148 may send a control signal to the volatile memory 144 to discard the data copy 182 and the parity copy 192. Otherwise, if the bit error detector 152 determines that the parity 194 does not correspond to the data 184, the bit error detector 152 may generate a bit error indicator that causes the data path protection circuit 148 to validate the data copy 182 that is in the volatile memory 144.

Validating the data copy 182 may include the encoder 154 (or the encoder 142) accessing the data copy 182 at the volatile memory 144 and processing the data copy 182 to generate the parity 195. The comparator 156 may compare the generated parity 195 to the parity copy 192, to the parity 194, or both. If the comparator 156 detects a match, the data copy 182 may be considered valid. The controller 130 or the data path protection circuit 148 may send a control signal to the volatile memory 144 to generate a copy of the data copy 182 and to transfer the copy to the data path 146 to replace the data 184. Otherwise, if the comparator 156 does not detect a match, the data copy 182 may be determined to be irrecoverably corrupted.

By maintaining the data copy 182 in the volatile memory 144, the controller 130 may recover from data corruption that may occur along the data path 146 without requesting resending of the data from the access device 170 and without implementing an ECC mechanism to protect data along the data path 146. Verifying the integrity of the copy of data prior to using the copy enables the controller 130 to further reduce the possibility that corrupted data is stored to the non-volatile memory 104. Data integrity may therefore be enhanced without extending the amount of time that the access device 170 is required to maintain a copy of the data sent to the data storage device 102 and without incurring the increased cost, complexity, and latency associated with implementing an internal ECC decoding stage at the output of the data path 146 for internal error correction.

Although a specific implementation is depicted in FIG. 1, other implementations may include data path protection using the data copy 182. For example, although the EDC check circuit 140, the encoder 142, and the data path protection circuit 148 are described as implementing a CRC scheme, in other implementations one or more of the EDC check circuit 140, the encoder 142, or the data path protection circuit 148 may implement an error detection scheme other than, or in addition to, a CRC scheme, such as a repetition code, a checksum, a hash function, one or more other schemes, or any combination thereof. Although the EDC check circuit 140, the encoder 142, and the data path protection circuit 148 are variously described as performing error detection operations, verifying data integrity, etc., it should be understood that an error detection code may be implemented that has a statistically unlikely, but non-zero, chance of failing to detect corrupted data. Thus, error detection and verifying data integrity as described herein are to be understood as being performed subject to the error detection capacity of the error detection scheme(s) implemented by the controller 130.

Although the EDC check circuit 140, the encoder 142, and the data path protection circuit 148 are described as implementing an error detection scheme, in other implementations one or more of the EDC check circuit 140, the encoder 142, or the data path protection circuit 148 may implement an error correction scheme, such as an error correction code (ECC) in place of, or in addition to, an EDC scheme. For example, parity bits of an ECC scheme may be used in place of a CRC check value for error detection in the above description. As another option, a low-power ECC decoder may be implemented to correct errors that occur during internal data transfers along the data path 146.

Although the controller 130 is illustrated as including the volatile memory 144, in other implementations at least a portion of the volatile memory 144 may be external to the controller 130 (e.g., a memory or set of registers that are external to the controller 130 and that are accessible to the controller 130). Further, although the data copy 182 is described as stored in the volatile memory 144, in other implementations non-volatile memory (e.g., resistive RAM (ReRAM)) may be used to store the data copy 182.

Although the controller 130 is described as storing the parity copy 192, in other implementations the parity copy 192 may not be stored. For example, as described with reference to FIG. 2, validity of the data copy 182 may be determined via generating the parity 195 for the data copy 182 and comparing the generated parity 195 to the parity 194. However, in implementations where the parity copy 192 is stored at the volatile memory 144, one or more additional data validity checks may be performed using the parity copy 192. For example, a CRC check using the data 184 and the parity copy 192 can validate the data 184 if the parity 194 and the data copy 182 have been corrupted.

Figure 2:
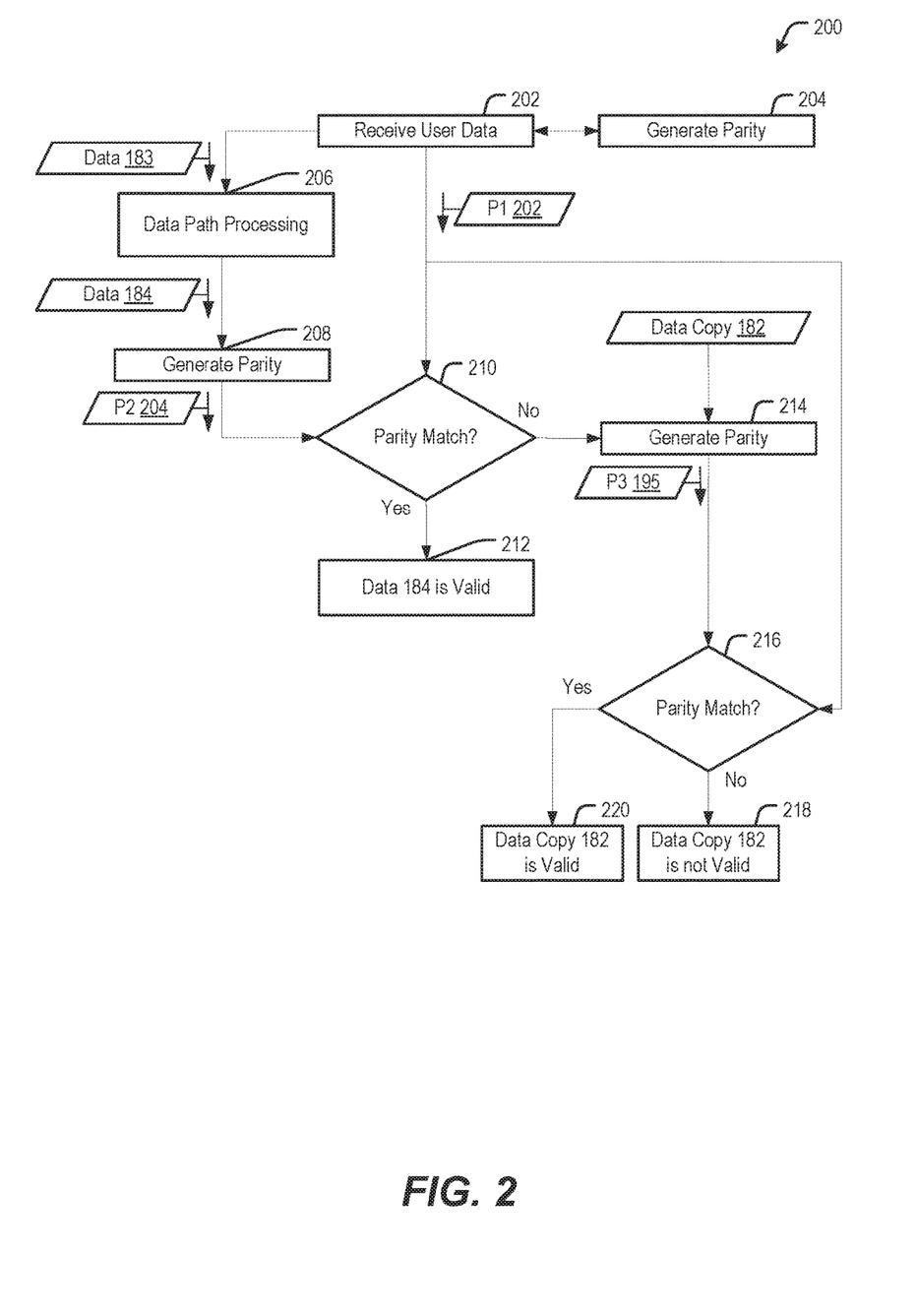
FIG. 2 is a flow diagram of a particular example of a method of operation that may be performed by the data storage device of FIG. 1.

Referring to FIG. 2, a particular illustrative example of a method 200 of data integrity protection that may be performed by the controller 130 of FIG. 1. The method 200 includes receiving user data, at 202. For example, the user data may correspond to the data 180 of FIG. 1. The user data may be stored to a memory, such as the data 181 stored in the volatile memory 144 of FIG. 1. A copy of the user data may also be generated and stored in the memory, such as the data copy 182 of FIG. 1.

Redundancy data P1 202 corresponding to the user data is generated, at 204. For example, the redundancy data P1 202 may correspond to the parity 190 of FIG. 1 received from the access device 170 or may be generated by the encoder 142. The redundancy data P1 202 may be stored as the parity 191 at the volatile memory 144 of FIG. 1.

Data path processing is applied to the data 183 to generate the data 184, at 206. For example, the data path processing may correspond to one or more data transfers or other components of the data path 146 of FIG. 1.

Error detection is performed to determine whether the data 184 includes any errors. The error detection may be performed by the data path protection circuit 148 of FIG. 1. For example, the encoder 154 may process the data 184 to generate parity P2 204, at 208.

A determination of whether the parity P2 204 matches the parity P1 202 may be made, at 210. For example, the comparator 156 of FIG. 1 may compare the parity P2 204 to the parity P1 202. The parity P1 202 may correspond to the parity 194 of FIG. 1 that accompanies the data 184 through the data path 146. Alternatively, the parity P1 202 may correspond to the parity 191 transferred to the data path protection circuit 148 (e.g., bypassing the data path 146). When the parity P1 202 matches the parity P2 204, the data 184 may be considered valid, at 212.

Otherwise, when the parity P1 202 does not match the parity P2 204, error detection is performed to determine whether the data copy 182 includes any errors. The error detection includes the data copy 182 of FIG. 1 being processed to generate the parity (P3) 195, at 214. For example, the encoder 154 or the encoder 142 may process the data copy 182 to generate the parity P3 195, and a determination of whether the parity P3 195 matches the parity P1 202 may be made, at 216. For example, the comparator 156 may compare the parity P3 195 to the parity P1202. If the parity P3 195 does not match the parity P1 202, the data copy 182 may be considered invalid, at 218. Otherwise, the data copy 182 may be considered valid, at 220, and the data copy 182 may be sent to the data processing circuit 150 via the data path 146 to replace the data 184.

In an implementation where the memory 144 stores the data copy 182 and the parity copy 192, the parity P3 195 may be generated based on the data copy 182 and may be compared to the parity copy 192 to validate the data copy 182 (e.g., at the decision 216). In another implementation where the memory 144 stores the data copy 182 but not the parity copy 192, the parity P3 195 may be generated based on the data copy 182 and may be compared to the parity 194 to validate the data copy 182. In another implementation where the memory 144 stores the parity copy 192 but does not store the data copy 182, the parity P2 204 may be compared to the parity copy 192 to determine whether the data 184 is valid (e.g., in case the parity 194 has been corrupted but the data 184 has not been corrupted, similar to Case 4 described with reference to Table 1, below).

Although FIG. 2 illustrates performing two parity comparisons: a first comparison to determine whether the data 184 is corrupt, and a second comparison to determine whether the data copy 182 is corrupt, in other implementations one or more other operations may be performed instead of, or in addition to, the operations depicted in FIG.

To illustrate, one or more errors may occur in the data 184, in the parity 194, in the data copy 182, in the parity copy 192, or a combination thereof. Table 1 illustrates operations that may be used to determine data validity based on different combinations of the data 184, the parity 194, the data copy 182, and the parity copy 192 being valid ("good" ("G")) or erroneous ("E"). In Table 1, an "X" ("don't care") indicates that the valid/erroneous state is unimportant.

TABLE 1

| Case | Data 184 | Parity 194 | Data Copy 182 | Parity Copy 192 | Outcome |
|---|---|---|---|---|---|
| 1 | G | G | x | x | Data 184 is valid via check with parity 194 |
| 2 | x | x | G | G | Data copy 182 is valid via check with parity copy 192 |
| 3 | G | E | G | E | Data 184 is valid via comparison to data copy 182 |
| 4 | G | E | E | G | Data 184 is valid via check with parity copy 192 |
| 5 | E | G | G | E | Data copy 182 is valid via check with parity 194 |
| 6 | G | E | E | E | No valid data is detected |
| 7 | E | E | G | E | No valid data is detected |
| 8 | E | x | E | x | No valid data is available |

In Table 1, case 1 corresponds to the data 184 and the parity 194 being valid, such as determined at 212 of FIG. 2. Case 2 corresponds to the data copy 182 and the parity copy 192 being valid, as determined at 220 of FIG. 2. Each of the remaining cases 3-8 of Table 1 corresponds to errors in two or more of the data 184, the parity 194, the data copy 182, and the parity copy 192. Because bit errors may be statistically unlikely, the probability any of cases 3-8 being encountered may be statistically insignificant. In addition, because the parity 194 and the parity copy 192 may have few bits (e.g., 64 bits) relative to the number of bits in the data 184 and the data copy 182 (e.g., 1024 bits), the probability of an error occurring in either or both of the parity 194 and the parity copy 192, such as in cases 3-7, may be even more unlikely. However, as Table 1 indicates, data validity may still be determined in cases 3-5 by performing a parity check using the data 184 with the parity copy 192 (case 4), by performing a parity check using the data copy 182 with the parity 194 (case 5), or by comparing the data 184 to the data copy 182 (case 3). Such determinations may be performed by the data path protection circuit 148 having access to the volatile memory 144 of FIG. 1.

Figure 3:
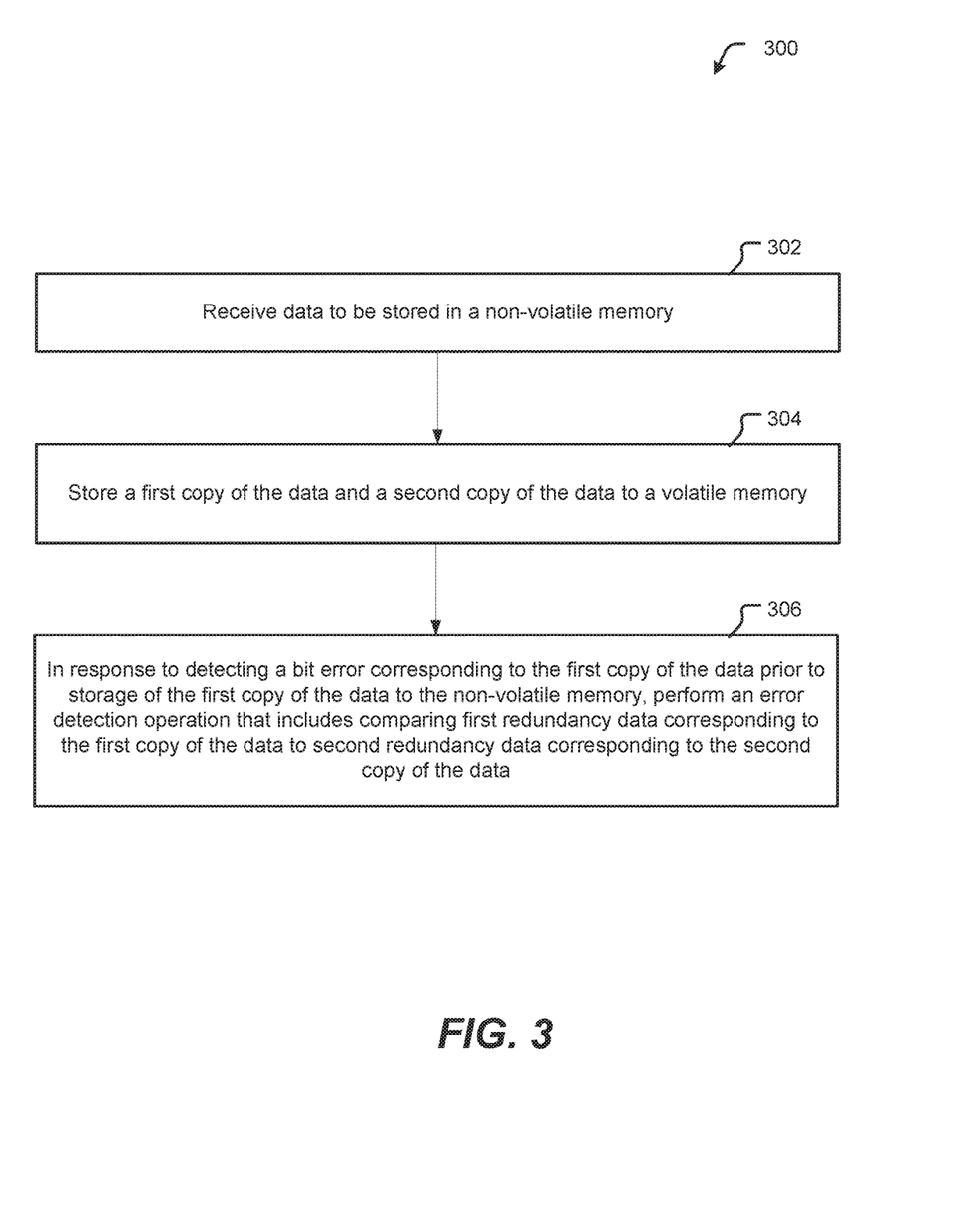
FIG. 3 is a flow diagram of a particular example of a method of operation that may be performed by the data storage device of FIG. 1.

Referring to FIG. 3, a particular illustrative example of a method of operation of a device is depicted and generally designated 300. The method 300 may be performed at a data storage device, such as at the controller 130 coupled to the memory device 103 of FIG. 1.

The method 300 includes receiving data to be stored in the non-volatile memory, at 302. For example, the controller 130 may receive the data 180 from the access device 170.

A first copy of the data and a second copy of the data are stored to a volatile memory, at 304. For example, the first copy of the data and the second copy of the data may correspond to the data 181 and the data copy 182 at the volatile memory 144 of FIG. 1.

The method 300 may include transferring the first copy of the data between the volatile memory and an error correction code (ECC) engine while retaining the second copy in the volatile memory. For example, the data 181 may be sent to the data path 146 as the data 183 of FIG. 1 to be transferred, via the data path 146, to the ECC engine 158.

In response to detecting a bit error corresponding to the first copy of the data prior to storage of the first copy of the data to the non-volatile memory, an error detection operation is performed that includes comparing first redundancy data corresponding to the first copy of the data to second redundancy data corresponding to the second copy of the data, at 306. The error detection operation may include accessing the second copy of the data at the volatile memory and generating the second redundancy data based on the second copy of the data. For example, the data path protection circuit 148 of FIG. 1 may detect an error in the data. 184, such as via comparing syndromes at 210 of FIG. 2. The data path protection circuit 148 may process the data copy 182 to generate the parity 195 and may compare the parity 194 to the parity 195, such as described at 214-215 of FIG. 2.

The first redundancy data may include first parity bits corresponding to an error detection coding scheme, and the second redundancy data may include second parity bits corresponding to the error detection coding scheme. For example, the error detection coding scheme may include a cyclic redundancy check (CRC) scheme.

The method 300 may include, in response to the error detection operation indicating that no error is detected in the second copy of the data, transferring the second copy of the data from the volatile memory to the ECC engine. For example, after determining that no errors are detected in the data copy 182 of FIG. 1, the data copy 182 may be sent to the data processing circuit 150 via the data path 146.

By performing the error detection operation that includes comparing the first redundancy data corresponding to the first copy of the data to the second redundancy data corresponding to the second copy of the data, the method 300 enables a controller of a data storage device to determine whether the second copy of the data is valid prior to sending the second copy of the data to replace the first copy of the data. As a result, the data storage device may reduce or prevent the loss of power, time, and processing resources that would be consumed by sending corrupt data along the data path.

Figure 4A:
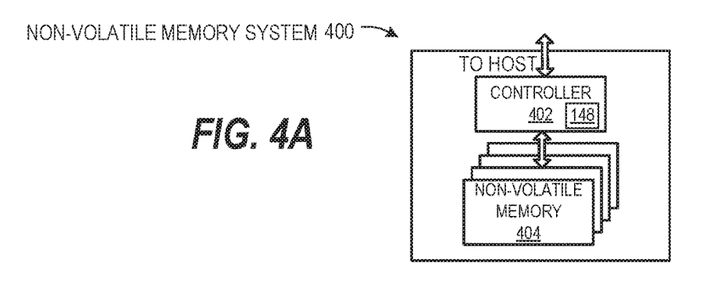
FIG. 4A is a block diagram of an illustrative example of a non-volatile memory system including a controller that includes the data path protection circuit of FIG. 1.
Figure 4B:
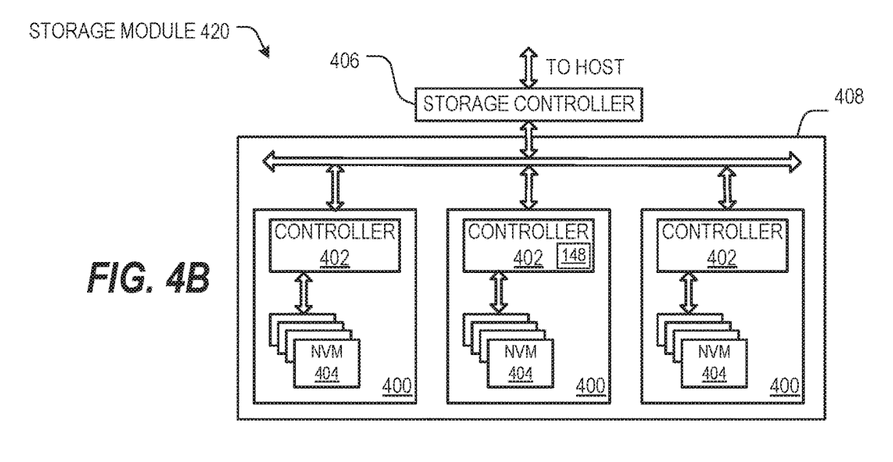
FIG. 4B is a block diagram of an illustrative example of a storage module that includes plural non-volatile memory systems that each may include the data path protection circuit of FIG. 1.
Figure 4C:
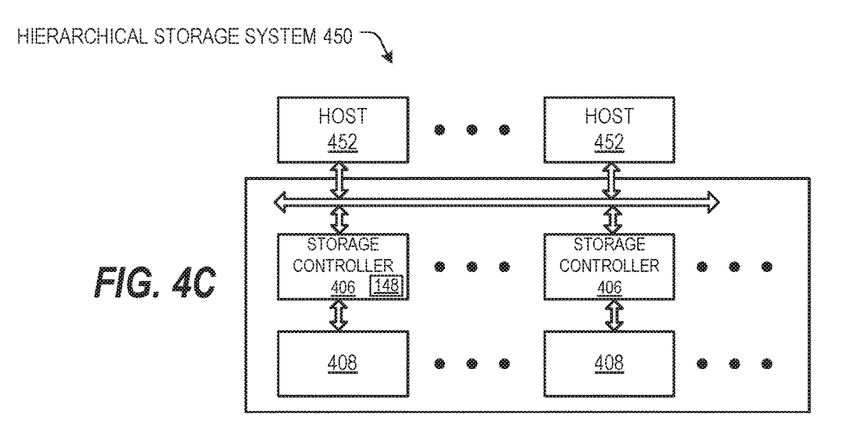
FIG. 4C is a block diagram of an illustrative example of a hierarchical storage system that includes a plurality of storage controllers that each may include the data path protection circuit of FIG. 1.

Memory systems suitable for use in implementing aspects of the disclosure are shown in FIGS. 4A-4C. FIG. 4A is a block diagram illustrating a non-volatile memory system according to an example of the subject matter described herein. Referring to FIG. 4A, a non-volatile memory system 400 includes a controller 402 and non-volatile memory (e.g., the memory device 103 of FIG. 1) that may be made up of one or more non-volatile memory die 404. As used herein, the term "memory die" refers to the collection of non-volatile memory cells, and associated circuitry for managing the physical operation of those non-volatile memory cells, that are formed on a single semiconductor substrate. The controller 402 may correspond to the controller 130 of FIG. 1. Controller 402 interfaces with a host system (e.g., the access device 170 of FIG. 1) and transmits command sequences for read, program, and erase operations to non-volatile memory die 404. The controller 402 may include the data path protection circuit 148 of FIG. 1.

The controller 402 (which may be a flash memory controller) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 402 can be configured with hardware and/or firmware to perform the various functions described below and shown in the flow diagrams. Also, sonic of the components shown as being internal to the controller can be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory, map out bad flash memory cells, and allocate spare cells to be substituted for future failed cells. Some part of the spare cells can be used to hold firmware to operate the flash memory controller and implement other features. In operation, when a host is to read data from or write data to the flash memory, the host communicates with the flash memory controller. If the host provides a logical address to which data is to be read/written, the flash memory controller can convert the logical address received from the host to a physical address in the flash memory. (Alternatively, the host can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 404 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 402 and non-volatile memory die 404 may be any suitable flash interface, such as Toggle Mode 200, 400, or 800. In one embodiment, non-volatile memory system 400 may be a card based system, such as a secure digital (SD) or a micro secure digital (micro-SD) card. In an alternate embodiment, memory system 400 may be part of an embedded memory system.

Although, in the example illustrated in FIG. 4A, non-volatile memory system 400 (sometimes referred to herein as a storage module) includes a single channel between controller 402 and non-volatile memory die 404, the subject matter described herein is not limited to having a single memory channel. For example, in some NAND memory system architectures (such as the ones shown in FIGS. 4B and 4C), 2, 4, 8 or more NAND channels may exist between the controller and the NAND memory device, depending on controller capabilities. In any of the embodiments described herein, more than a single channel may exist between the controller 402 and the non-volatile memory die 404, even if a single channel is shown in the drawings.

FIG. 4B illustrates a storage module 420 that includes plural non-volatile memory systems 400. As such, storage module 420 may include a storage controller 406 that interfaces with a host and with storage system 408, which includes a plurality of non-volatile memory systems 400. The interface between storage controller 406 and non-volatile memory systems 400 may be a bus interface, such as a serial advanced technology attachment (SATA) or peripheral component interface express (PCIe) interface. Storage module 420, in one embodiment, may be a solid state drive (SSD), such as found in portable computing devices, such as laptop computers, and tablet computers. Each controller 402 of FIG. 4B may include the data path protection circuit 148. Alternatively or in addition, the storage controller 406 may include the data path protection circuit 148.

FIG. 4C is a block diagram illustrating a hierarchical storage system. A hierarchical storage system 450 includes a plurality of storage controllers 406, each of which controls a respective storage system 408. Host systems 452 may access memories within the hierarchical storage system 450 via a bus interface. In one embodiment, the bus interface may be a Non-Volatile Memory Express (NVMe) or fiber channel over Ethernet (FCoE) interface. In one embodiment, the hierarchical storage system 450 illustrated in FIG. 4C may be a rack mountable mass storage system that is accessible by multiple host computers, such as would be found in a data center or other location where mass storage is needed. Each storage controller 406 of FIG. 4C may include the data path protection circuit 148.

Figure 5A:
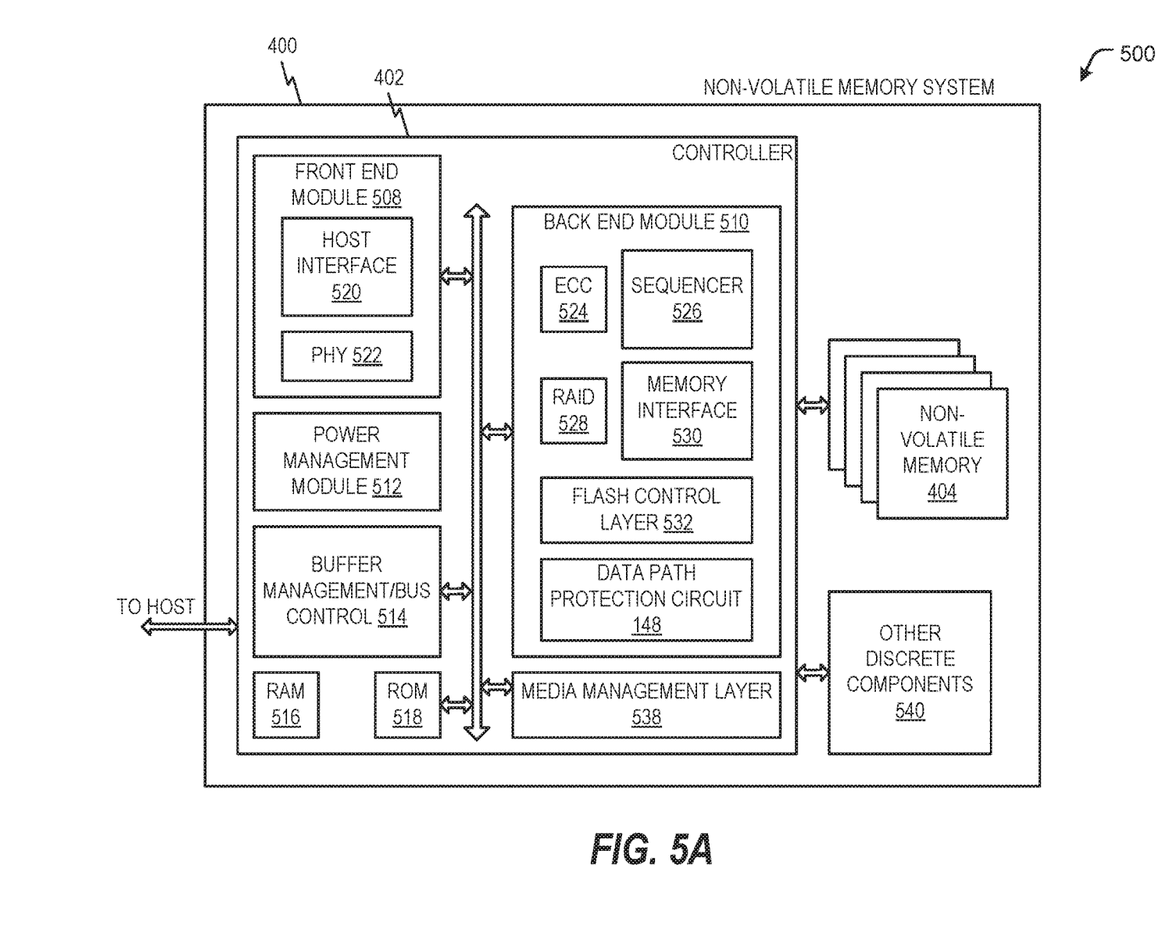
FIG. 5A is a block diagram illustrating an example of a non-volatile memory system including a controller that includes the data path protection circuit of FIG. 1.

FIG. 5A is a block diagram illustrating exemplary components of the controller 402 in more detail. The controller 402 includes a front end module 508 that interfaces with a host, a back end module 510 that interfaces with the one or more non-volatile memory die 404, and various other modules that perform other functions. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to modules of the controller 402, a buffer manager/bus controller 514 manages buffers in random access memory (RAM) 516 and controls the internal bus arbitration of the controller 402. A read only memory (ROM) 518 stores system boot code. Although illustrated in FIG. 5A as located within the controller 402, in other embodiments one or both of the RAM 516 and the ROM 518 may be located externally to the controller 402. In yet other embodiments, portions of RAM and ROM may be located both within the controller 402 and outside the controller 402.

Front end module 508 includes a host interface 520 and a physical layer interface (PHY) 522 that provide the electrical interface with the host or next level storage controller. The choice of the type of host interface 520 can depend on the type of memory being used. Examples of host interfaces 520 include, but are not limited to, SATA, SATA Express, Serial Attached Small Computer System Interface (SAS), Fibre Channel, USB, PCIe, and NVMe. The host interface 520 typically facilitates transfer for data, control signals, and timing signals.

Back end module 510 includes an error correction code (ECC) engine 524 that encodes the data received from the host, and decodes and error corrects the data read from the non-volatile memory. A command sequencer 526 generates command sequences, such as program and erase command sequences, to be transmitted to non-volatile memory die 404. A RAID (Redundant Array of Independent Drives) module 528 manages generation of RAID parity and recovery of failed data. The RAID parity may be used as an additional level of integrity protection for the data being written into the non-volatile memory die 404. In some cases, the RAID module 528 may be a part of the ECC engine 524. A memory interface 530 provides the command sequences to non-volatile memory die 404 and receives status information from non-volatile memory die 404. For example, the memory interface 530 may be a double data rate (DDR) interface, such as a Toggle Mode 200, 400, or 800 interface. A flash control layer 532 controls the overall operation of back end module 510. The back end module 510 may also include the data path protection circuit 148.

Additional components of system 500 illustrated in FIG. 5A include a power management module 512 and a media management layer 538, which performs wear leveling of memory cells of non-volatile memory die 404. System 500 also includes other discrete components 540, such as external electrical interfaces, external RAM, resistors, capacitors, or other components that may interface with controller 402. In alternative embodiments, one or more of the physical layer interface 522, RAID module 528, media management layer 538 and buffer management/bus controller 514 are optional components that are omitted from the controller 402.

Figure 5B:
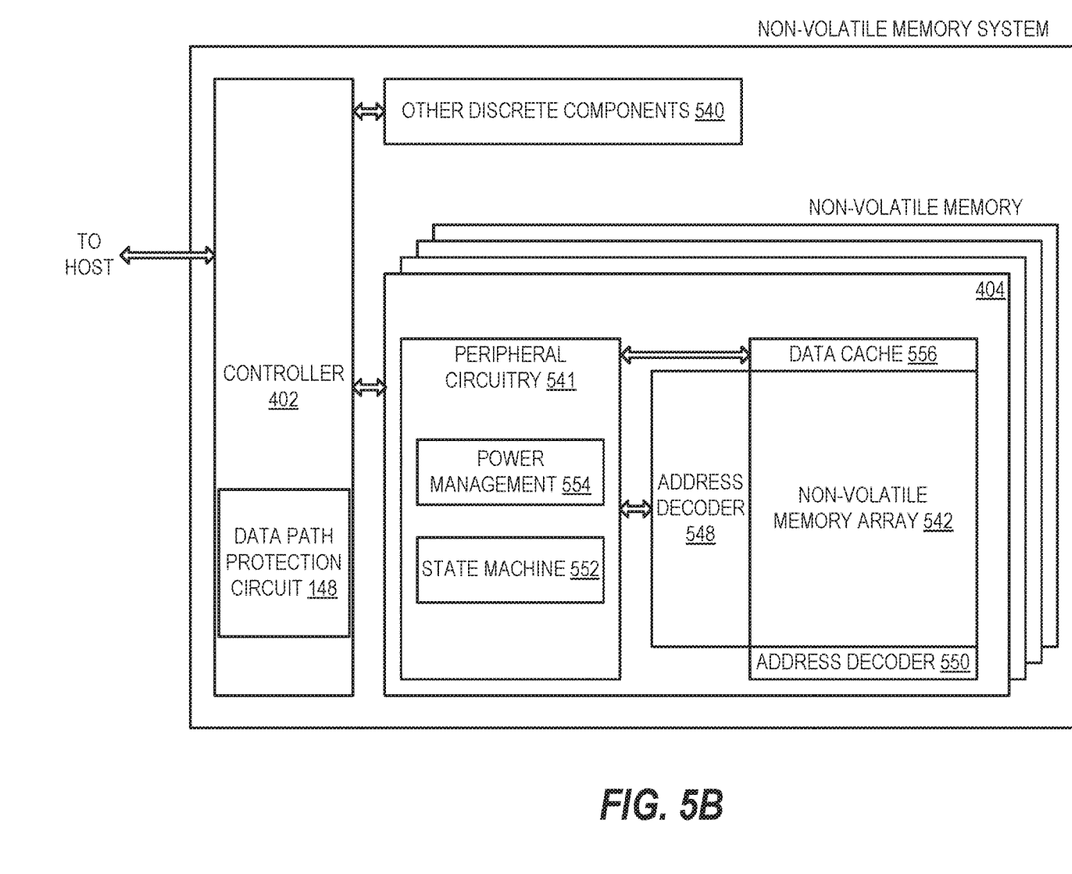
FIG. 5B is a block diagram illustrating exemplary components of a non-volatile memory die that may be coupled to a controller that includes the data path protection circuit of FIG. 1.

FIG. 5B is a block diagram illustrating exemplary components of non-volatile memory die 404 in more detail. Non-volatile memory die 404 includes peripheral circuitry 541 and non-volatile memory array 542. Non-volatile memory array 542 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 541 includes a state machine 552 that provides status information to controller 402, which may include the data path protection circuit 148. The peripheral circuitry 541 may also include a power management or data latch control module 554. Non-volatile memory die 404 further includes discrete components 540, an address decoder 548, an address decoder 550, and a data cache 556 that caches data.

Although various components depicted herein are illustrated as block components and described in general terms, such components may include one or more microprocessors, state machines, or other circuits configured to enable the controller 130 to generate the parity 195 corresponding to the data copy 182 and to compare the parity 195 to the parity 194. For example, the data path protection circuit 148, the encoder 154, the comparator 156, or a combination thereof, may represent physical components, such as hardware controllers, state machines, logic circuits, or other structures, to generate parity bits and to perform parity bit comparisons to determine data validity. The data path protection circuit 148, the encoder 154, and the comparator 156, may be implemented using a microprocessor or microcontroller programmed to generate the parity 195 corresponding to the data copy 182 and to compare the parity 195 to the parity 194.

Although the controller 130 and certain other components described herein are illustrated as block components and described in general terms, such components may include one or more microprocessors, state machines, and/or other circuits configured to enable the data storage device 102 (or one or more components thereof) to perform operations described herein. Components described herein may be operationally coupled to one another using one or more nodes, one or more buses (e.g., data buses and/or control buses), one or more other structures, or a combination thereof. One or more components described herein may include one or more physical components, such as hardware controllers, state machines, logic circuits, one or more other structures, or a combination thereof, to enable the data storage device 102 to perform one or more operations described herein.

Alternatively or in addition, one or more aspects of the data storage device 102 may be implemented using a microprocessor or microcontroller programmed (e.g., by executing instructions) to perform one or more operations described herein, such as one or more operations of the methods 200-400. In a particular embodiment, the data storage device 102 includes a processor executing instructions (e.g., firmware) retrieved from the memory device 103. Alternatively or in addition, instructions that are executed by the processor may be retrieved from memory separate from the memory device 103, such as at a read-only memory (ROM) that is external to the memory device 103.

It should be appreciated that one or more operations described herein as being performed by the controller 130 may be performed at the memory device 103. As an illustrative example, in-memory ECC operations (e.g., encoding operations and/or decoding operations) may be performed at the memory device 103 alternatively or in addition to performing such operations at the controller 130.

To further illustrate, the data storage device 102 may be configured to be coupled to the access device 170 as embedded memory, such as in connection with an embedded MultiMedia Card (eMMC®) (trademark of JEDEC Solid State Technology Association, Arlington, Va.) configuration, as an illustrative example. The data storage device 102 may correspond to an eMMC device. As another example, the data storage device 102 may correspond to a memory card, such as a Secure Digital (SD®) card, a microSD® card, a miniSD™ card (trademarks of SD-3C LLC, Wilmington Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof.

The memory device 103 may include a three-dimensional (3D) memory, such as a resistive random access memory (ReRAM), a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), or a combination thereof. Alternatively or in addition, the memory device 103 may include another type of memory in a particular embodiment, the data storage device 102 is indirectly coupled to an access device (e.g., the access device 170) via a network. For example, the data storage device 102 may be a network-attached storage (NAS) device or a component (e.g., a solid-state drive (SSD) component) of a data center storage system, an enterprise storage system, or a storage area network. The memory device 103 may include a semiconductor memory device.

Semiconductor memory devices include volatile memory devices, such as dynamic random access memory ("DRAM") or static random access memory ("SRAM") devices, non-volatile memory devices, such as resistive random access memory ("ReRAM"), magnetoresistive random access memory ("MRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/ or over a substrate may be arranged in two or three dimensions, such as a two dimensional memory structure or a three dimensional memory structure, in a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the v direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional exemplary structures described but cover all relevant memory structures within the spirit and scope of the disclosure as described herein and as understood by one of skill in the art. The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Those of skill in the art will recognize that such modifications are within the scope of the present disclosure.

The above-disclosed subject matter is to be considered illustrative, and not restrictive, and the appended claims are intended to cover all such modifications, enhancements, and other embodiments, that fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:
1. A device comprising:
a non-volatile memory;
a data processing circuit comprising an output coupled to the non-volatile memory; and
a controller coupled to the non-volatile memory, the controller configured to:
receive data to be stored in the non-volatile memory;
store a first copy of the data and a second copy of the data to a volatile memory;
transfer the first copy of the data to the data processing circuit;

detect a bit error corresponding to the first copy of the data at the data processing circuit prior to storage of the first copy of the data to the non-volatile memory;

perform an error detection operation that includes comparing first redundancy data corresponding to the first copy of the data to second redundancy data corresponding to the second copy of the data; and selectively transfer the second copy of the data to the data processing circuit based on whether the second copy of the data contains any errors.

2. The device of claim 1, wherein the controller is configured to transfer the first copy of the data from the volatile memory to an error correction code (ECC) engine while retaining the second copy of the data in the volatile memory.

3. The device of claim 2, wherein the controller is configured, in response to the error detection operation indicating that no error is detected in the second copy of the data to transfer the second copy of the data from the volatile memory to the ECC engine.

4. The device of claim 1, wherein the controller comprises a data path protection circuit configured to detect the bit error.

5. The device of claim 4, wherein the data path protection circuit is further configured to perform the error detection operation.

6. The device of claim 1, wherein the first redundancy data includes first parity bits corresponding to an error detection coding scheme, and wherein the second redundancy data includes second parity bits corresponding to the error detection coding scheme.

7. The device of claim 1, wherein the error detection operation includes, prior to comparing the first redundancy data to the second redundancy data, accessing the second copy of the data at the volatile memory and generating the second redundancy data based on the second copy of the data.

8. A data storage device comprising:
a volatile memory;
a data processing circuit coupled to the volatile memory;
a non-volatile memory coupled to an output of the data processing circuit; and
a data path protection circuit configured, in response to detection of a bit error corresponding to a first copy of data at an input of the data processing circuit, to compare first redundancy data corresponding to the first copy of the data to second redundancy data corresponding to a second copy of the data that is stored in the volatile memory.

9. The data storage device of claim 8, wherein the data path protection circuit comprises:
an encoder configured to process the second copy of the data to generate the second redundancy data; and
a comparator configured to compare the first redundancy data to the second redundancy data.

10. The data storage device of claim 8, wherein the data processing circuit includes an error correction coding (ECC) engine.

11. The data storage device of claim 8, further comprising:
an access device interface configured to receive the first copy of the data and the first redundancy data from an access device; and
an error detection code (EDC) check circuit coupled to the access device interface, the EDC check circuit configured to process the first copy of the data and the first redundancy data received from the access device to determine if any errors are detected in the first copy of the data and the first redundancy data.

12. The data storage device of claim 11, wherein the volatile memory is configured to receive and store the first copy of the data and the first redundancy data from the access device interface.

13. The data storage device of claim 8, further comprising:
an access device interface configured to receive the first copy of the data from an access device; and
an encoder coupled to the access device interface, the encoder configured to process the first copy of the data received from the access device to generate the first redundancy data.

14. A method comprising:
at a controller coupled to a non-volatile memory, performing:
receiving data to be stored in the non-volatile memory;
storing a first copy of the data and a second copy of the data to a volatile memory;
transferring the first copy of the data to an input of a data processing circuit coupled to the non-volatile memory; and
in response to detecting a bit error corresponding to the first copy of the data at the input of the data processing circuit prior to storage of the first copy of the data to the nonvolatile memory, performing an error detection operation that includes comparing first redundancy data corresponding to the first copy of the data to second redundancy data corresponding to the second copy of the data, and upon determining that the second copy of the data contains no errors, transferring the second copy of the data to the input of the data processing circuit.

15. The method of claim 14, further comprising transferring the first copy of the data between the volatile memory and an error correction code (ECC) engine while retaining the second copy of the data in the volatile memory.

16. The method of claim 15, further comprising, in response to the error detection operation indicating that no error is detected in the second copy of the data, transferring the second copy of the data from the volatile memory to the ECC engine.

17. The method of claim 15, further comprising receiving redundancy data corresponding to the data prior to detecting the bit error, and wherein the bit error is detected by generating the first redundancy data corresponding to the first copy of the data and comparing the first redundancy data to the received redundancy data.

18. The method of claim 14, wherein the first redundancy data includes first parity bits corresponding to an error detection coding scheme, and wherein the second redundancy data includes second parity bits corresponding to the error detection coding scheme.

19. The method of claim 18, wherein the error detection coding scheme includes a cyclic redundancy check (CRC) scheme.

20. The method of claim 14, wherein the error detection operation includes, prior to comparing the first redundancy data to the second redundancy data, accessing the second copy of the data at the volatile memory and generating the second redundancy data based on the second copy of the data.

* * * * *